United States Patent [19]

Kaess et al.

[11] 3,723,549

[45] Mar. 27, 1973

[54] PROCESS FOR PREPARING VINYLIDENE FLUORIDE

[75] Inventors: Franz Kaess, Traunstein; Klaus Lienhard, Trostberg-Mogling; Horst Michaud, Trostberg, all of Germany

[73] Assignee: Suddeutsche Kalkstickstoff-Werke Aktiengesellschaft, Trostberg, Oberbayern, Germany

[22] Filed: Aug. 11, 1971

[21] Appl. No.: 171,023

Related U.S. Application Data

[62] Division of Ser. No. 756,329, Aug. 29, 1968.

[30] Foreign Application Priority Data

Aug. 29, 1967  Germany...........................S 111 575
Aug. 29, 1967  Germany...........................S 111 576

[52] U.S. Cl...............................................260/653.3

[51] Int. Cl.................................................C07c 21/18
[58] Field of Search.....................................260/653.3

[56] References Cited

FOREIGN PATENTS OR APPLICATIONS 823,519    11/1959    Great Britain...............260/653.3
1,288,085   1/1969    Germany.....................260/653.3

*Primary Examiner*—Daniel D. Horwitz
*Attorney*—Christen, Sabol & O'Brien

[57] ABSTRACT

Vinylidene fluoride is produced by the gaseous phase reaction of vinylidene chloride with at least 2 mols of hydrofluoric acid per mol of vinylidene chloride at a temperature of from 200° to 400°C. in presence of a catalyst selected from trivalent chromium salts and aluminum fluoride activated with a vanadium, tin or lanthanum compound.

8 Claims, No Drawings

PROCESS FOR PREPARING VINYLIDENE FLUORIDE

This application is a division of application for U.S. Pat. Ser. NO. 756,329, filed Aug. 29, 1968.

This invention relates to the production of vinylidene fluoride by the fluorination of vinylidene chloride in the gaseous phase.

Vinylidene fluoride has attained considerable importance as a monomer for use in the production of homopolymers and copolymers. The homopolymers are especially useful for outside surface coatings and for chemical apparatus, because of their excellent resistance to atmospheric influences, chemicals and higher temperatures. The copolymers, especially those with trifluorochloroethylene or hexafluoropropylene, are elastomers having desirable characteristics, such as outstanding resistance to chemicals, high abrasion resistance and temperature stability.

Various methods have become known for the production of monomeric vinylidene fluoride. Processes which are based on the elimination of hydrochloric acid from 1,1,1-difluorochloroethane (German Patent No. 1,068,695) or hydrofluoric acid from 1,1,1-trifluoroethane (U.S. Pat. No. 3,188,356) require starting materials that are difficult to obtain and relatively high temperatures, which in combination with the escaping halogen acids puts considerable demands on technology and apparatus. Moreover, such pyrolysis reactions have the disadvantage that a number of undesired by-products are often produced.

Further developments have been made due to the search for more readily available starting materials. Thus vinylidene fluoride can be produced, for example, by pyrolytic condensation of difluorochloromethane with methyl chloride (H. Mandai-R. Miller, J. prakt. chem. 19 (4), 202, 1963). The yields according to this process, however, are relatively low and the competing reaction of the formation of tetrafluoroethylene from two molecules of difluorochloromethane is difficult to suppress.

Vinylidene chloride is a starting material that has long been produced on a technical scale. However, previous attempts to produce vinylidene fluoride from this substance were carried out under intermittent pressure and saturated intermediate products had then to be converted in a second step through pyrolytic halogen acid elimination into vinylidene fluoride ( U.S. Pat. No. 2,637,747).

The process of the present invention for the production of vinylidene fluoride comprises reacting vinylidene chloride with hydrofluoric acid in a mol ratio of 1 : >2 in a single reduction step in the gaseous phase at a temperature of 200°–400°C. in the presence of trivalent chromium salts previously heated to the reaction temperature under non-oxidizing conditions, or in the presence of aluminum fluoride activated with vanadium, tin or lanthanum.

The trivalent chromium salts may be deposited on a support, preferably activated carbon. Chromium salts which may be used include, for example, the chloride, bromide, fluoride, sulfate, nitrate, phosphate, formate and acetate. halogen A chromium salt-containing catalyst for fluorination and halide exchange reactions is described in U. S. Pat. No. 2,745,886. According to chemical analysis the catalyst has the formula $CrO_3F_2$. In its preparation from hydrated trivalent chromium fluoride an oxidizing pretreatment is essential, so that in the resultant catalyst, chromium of higher valence is present. This patented catalyst also differs substantially in its effect from the catalyst of the present invention. For example, it is not possible according to the patent to substitute fluorine for halogen atoms that are directly connected to a double bond carbon atom, unless chlorine or bromine is mixed with the unsaturated halogen hydrocarbon in the reaction with hydrofluoric acid. Consequently, however, only saturated fluorine containing compounds are obtained.

It is also known from German patent 1,000,798 to use aluminum fluoride with or without admixture with magnesium or copper or their halides as a ccatalyst in the production of aliphatic fluorine compounds. This method is quite satisfactory for the reaction of saturated hydrocarbons, especially in the fluorination of carbon tetrachloride. In the reaction of unsaturated halogenated hydrocarbons with hydrofluoric acid, aside from halogen substitution, hydrofluoric acid addition must also take place, so that saturated flouridized hydrocarbons result.

With the catalysts of the present invention, a conversion to vinylidene fluoride of from 95 percent to more than 99 percent based on the vinylidene chloride introduced in the reaction is obtained. The total non-utilizable by-products, i.e., those which cannot by return to the process be converted to vinylidene fluoride, as $CH_2 = CClF$ can be, amount in any case to less than 0.5 percent based on the vinylidene chloride introduced. In the process of the present invention, halogen exchange in the case of vinylidene chloride thus succeeds selectively, i.e., with little or no addition of hydrofluoric acid to the double bond, so that in contrast to known methods for producing vinylidene fluoride, an additional step for elimination of halogen acid is not necessary. In contrast, the results herein are unsatisfactory when aluminum fluoride is impregnated with compounds of cadmium, chromium, iron, manganese, molybdenum, nickel, zinc or zirconium.

The most favorable temperature range for the catalytic fluorination of vinylidene chloride according to the present invention is from 200° to 400°C., preferably from 250° to 350°C. At higher temperatures, the formation of by-products increases, while at lower temperatures the conversion decreases.

The reaction requires 2 mols of hydrofluoric acid per mol vinylidene chloride. It has been found advantageous, however, to use in addition an excess of hydrofluoric acid. Favorably molar ratios of vinylidene chloride to hydrofluoric acid are between 1:2.5 and 1:6, preferably between 1:3.5 and 1:5.5.

The space velocity is suitably adjusted to less than 500 N Ltr/h · Ltr, (500 liters gaseous reaction mixture per hour · catalyst charge volume in liters). N signifies normal conditions (pressure, temperature). The range of 100 to 300 N Ltr/h · Ltr has been found to be especially suitable.

Since the reaction proceeds without change in mol volume, the influence of pressure is of no importance. The process is therefore suitably conducted at normal pressure, particularly since increased pressure may lead to an increased formation of by-products, especially saturated compounds.

Isolation of vinylidene fluoride from the reaction mixture and separation of the unreacted starting materials is conducted in the usual manner, in such a way, however, that the latter are recovered in an anhydrous condition and may be recycled into the reactor.

EXAMPLES 1 TO 7

150 grams $CrCl_2 \cdot 6H_2O$ were slowly heated to 300°C. in an evacuated glass flask connected to a running water jet pump until the initially dark green crystals changed into a solid violet porous mass. The mass after cooling was comminuted and screened to a particle size of from 2 to 5 mm. Weight loss during the heating under vacuum amounted to 35 percent. 280 ml (81 grams) of the granulated catalyst were introduced into an iron pipe of 27 mm internal diameter and was brought to reaction temperature. A mixture of vinylidene chloride ($VC_2$) and hydrofluoric acid (HF) was then passed through. The gases emerging from the reactor were washed with water and caustic soda solution, dried and condensed in condensers cooled with liquid nitrogen. The content of vinylidene fluoride ($VF_2$) in the condensate was determined by gas chromatography.

The results obtained under various working conditions are shown in the following tables:

| Example | Mol Ratio $VC_2$:HF | Temp °C | Space Velocity N N Ltr/h · Ltr | Yield of $VF_2$ in Mol % |
|---|---|---|---|---|
| 1 | 1:4.7 | 345 | 300 | 97.0 |
| 2 | 1:2.7 | 330 | 155 | 96.5 |
| 3 | 1:5.3 | 290 | 200 | 99.8 |
| 4 | 1:3.8 | 380 | 170 | 86.0 |
| 5 | 1:4.5 | 345 | 110 | 98.5 |
| 6 | 1:4.1 | 420 | 570 | 56.0 |
| 7 | 1:5.0 | 250 | 200 | 95.0 |

EXAMPLE 8

210 grams activated carbon with an average particle size of 2 mm was saturated with 400 ml of an aqueous solution of 65 grams chromium trichloride ($CrCl_3 \cdot 6H_2O$). The mixture was heated with stirring to 250°C. for about 2 hours for the removal of the water. The catalyst so obtained contained 4.1 percent by weight chromium.

The catalyst was placed in the same apparatus as in Examples 1–7, and a vaporous mixture of 1 part by volume vinylidene chloride and 3 parts by volume hydrofluoric acid was passed therethrough. The reaction temperature was 300°C and the space velocity was 200 N Ltr/h · Ltr. The vinylidene fluoride yield in mol percent based on the vinylidene chloride starting material was 98 percent.

EXAMPLES 9 TO 11

75 grams $CrCl_3 \cdot 6H_2O$ were dissolved in 1.5 liters of water and trivalent chromium hydroxide was precipitated at elevated temperature with a small excess of ammonia, filtered, washed and divided into three parts. Each third of freshly filtered and washed chromium hydroxide was suspended in 500ml water and stirred with an amount just sufficient for solution of concentrated $H_2SO_4$, concentrated $HNO_3$ and glacial acetic acid respectively.

150 grams activated carbon (particle size 2–3 mm) was introduced into each of three rotating tubes heated to 200°–300°C and each impregnated by adding one of the freshly prepared trivalent chromium salt solutions. In this way the following catalysts were obtained:

Catalyst A: $Cr_2(SO_4)_3$/ activated carbon containing 2.9 percent Cr by weight Catalyst B: $Cr(NO_3)_3$/activated carbon containing 2.8 percent Cr by weight Catalyst C: $Cr(CH_3COO)_3$/activated carbon containing 2.9 percent Cr by weight.

In each case, 280 ml of one of these catalysts was placed in an iron pipe reactor (27 mm internal diameter) heated with a fused salt bath. Gaseous vinylidene chloride and hydrofluoric acid in a mol ratio of 1:4 and at a space velocity of 150 N liters of the gaseous mixture per hour · volume liter of catalyst charge were passed through the reactor at 340°C. After removing the halogen acids by washing and drying, the gas mixture leaving the reactor was analyzed by gas chromatography.

The results are listed in the following table:

| Example | Catalyst | Yields of Fluorination Products (%) | | | |
|---|---|---|---|---|---|
| | | $CH_2=CF_2$ | $CH_2=CFCl$ | $CH_2=CCl_2$ | Unknown by-products |
| 9 | A | 97.0 | 0.7 | 2.1 | 0.2 |
| 10 | B | 97.2 | 0.6 | 2.0 | 0.2 |
| 11 | C | 98.2 | 0.5 | 1.2 | 0.3 |

EXAMPLE 12

Activated $AlF_3$ having a particle size of 2–3 mm was heated in a rotating tube to 200°–300°C. and during rotation, aqueous $La(NO_3)_3$ solution was dropped in. The water evaporated immediately and the lanthanum compound was deposited on the surface of the $AlF_3$ particles. The catalyst formed in this way contained 3.5 percent by weight of lanthanum.

This catalyst was introduced into a pipe of standard steel with 27 mm internal diameter and heated in a fused salt bath to the reaction temperature measured in the center of the catalyst layer. A gaseous mixture of vinylidene chloride and hydrofluoric acid in a mol ratio 1:4.3 was passed through the catalyst layer at space velocity of 160 N Ltr/h · Ltr and a temperature of 345°C. The gas mixture emerging from the reactor was passed through two receivers filled with water and 10 percent caustic soda solution respectively to wash out unreacted hydrofluoric acid together with hydrochloric acid resulting from the reaction. The washed gases were dried, condensed in condensers cooled with liquid nitrogen and the condensate analyzed by gas chromatography. The fluorination products were obtained in the following yields:

| | |
|---|---|
| $CH_2=CF_2$ | 96.0% |
| $CH_2=CFCl$ | 0.8% |
| Other by-products | 0.2% |
| Unreacted $CH_2=CCl_2$ | 3.0% |

By distillation, vinylidene fluoride of 99.9 percent purity and having a boiling point of −82° to −81°C. was recovered from the condensate. The compound was identified by its IR spectrum and the purity determined by gas chromatography.

EXAMPLE 13

In similar manner as in Example 12, by impregnating aluminum fluoride with an aqueous solution of ammonium vanadate, a catalyst was obtained containing 4.8 percent by weight vanadium.

In the apparatus described in Example 12, 1 volume part hydrofluoric acid was reacted on this catalyst with 3.5 volume parts vinylidene chloride at 330°C. The space velocity of the reaction mixture was 110 N Ltr/h · Ltr.

The reaction products obtained (in mol percent based on vinylidene chloride starting material) were

| | |
|---|---|
| $CH_2=CF_2$ | 94.6% |
| $CH_2=CClF$ | 1.0% |
| Other by-products | 0.4% |
| $CH_2=CCl_2$ | 4.0% |

EXAMPLE 14

A catalyst was prepared by impregnation of $AlF_3$ with aqueous $SnCl_2$ solution and contained 6.8 percent Sn.

A gaseous mixture of vinylidene chloride and hydrofluoric acid (mol ratio 1:2.9) was passed over the catalyst at 290°C. at a space velocity of 180 N Ltr/h · Ltr in the apparatus described in Example 12. From the analysis of the reaction products the following yields were calculated:

| | |
|---|---|
| $CH_2=CF_2$ | 95.5% |
| $CH_2=CClF$ | 0.5% |
| Other by products | 0.2% |
| $CH_2=CCl_2$ (unreacted) | 3.8%. |

What is claimed is:

1. A process for the production of vinylidene fluoride which comprises reacting, in the gaseous phase, vinylidene chloride with at least 2 mols of hydrofluoric acid per mol of vinylidene chloride at a temperature between 200° and 400°C. in the presence of an $AlF_3$ catalyst in combination with an activator selected from the group consisting of $La(NO_3)_3$, ammonium vanadate and $SnCl_2$.

2. A process according to claim 1 wherein the reaction is carried out at a temperature between 250° and 350°C.

3. A process according to claim 1 wherein the mol ratio of vinylidene chloride to hydrofluoric acid is between 1:2.5 and 1:6.

4. A process according to claim 3 wherein the mol ratio is between 1:3.5 and 1:5.5.

5. A process according to claim 1 wherein the gaseous mixture of vinylidene chloride and hydrofluoric acid is passed over the catalyst at a space belocity below 500 N. Ltr/h.Ltr.

6. A process according to claim 5 wherein the space velocity is from 100 to 300 N. Ltr./h. Ltr.

7. A process according to claim 1 wherein the reaction is carried out at atmospheric pressure.

8. A process according to claim 1 wherein the reaction is carried out in a continuous manner.

* * * * *